United States Patent
Hui et al.

(10) Patent No.: US 6,272,558 B1
(45) Date of Patent: Aug. 7, 2001

(54) APPLICATION PROGRAMMING INTERFACE FOR MANIPULATING FLASHPIX FILES

(75) Inventors: Jonathan Hui, Fremont; Chris See Liang Yeo, Redwood City; Joe Zheng, Saratoga, all of CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/944,830

(22) Filed: Oct. 6, 1997

(51) Int. Cl.[7] .................................................. G06F 9/00
(52) U.S. Cl. .............................................................. 709/328
(58) Field of Search .................................. 358/296, 408, 358/487, 451; 364/518; 709/302, 328; 707/103

(56) References Cited

U.S. PATENT DOCUMENTS

| | | | |
|---|---|---|---|
| 4,833,625 | * 5/1989 | Fisher et al. ........................ | 364/518 |
| 5,218,455 | * 6/1993 | Kristy ................................... | 358/403 |
| 5,319,471 | * 6/1994 | Takei et al. ........................... | 358/451 |
| 5,493,408 | * 2/1996 | Kurogane et al. .................... | 358/296 |
| 5,666,215 | * 9/1997 | Fredlund et al. ..................... | 358/487 |
| 5,760,916 | * 6/1998 | Dellert et al. ........................ | 358/408 |
| 5,838,906 | * 11/1998 | Doyle et al. ......................... | 709/202 |
| 5,926,636 | * 7/1999 | Lam et al. ............................ | 709/303 |
| 6,018,743 | * 1/2000 | Xu ........................................ | 707/103 |

OTHER PUBLICATIONS

Enrich Gamma et al., Design Pattern—Elements of Reusable Object–Oriented Software, 1995, pp. 185–193.
FlashPix Format Specification Version 1.0.1, Eastman Kodak Company, Jul. 10, 1997, (154 pages).
FlashPix Reference Implementation Programmer's Guide Version 1.0, Eastman Kodak Company, Jan. 29, 1997, (272 pages).

* cited by examiner

Primary Examiner—Majid A. Banankhah
Assistant Examiner—Sue Liao
(74) Attorney, Agent, or Firm—Fitzpatrick, Cella, Harper & Scinto (57) ABSTRACT

A system to provide an application programming interface (API) to a client application for manipulating FlashPix-formatted files, the API having functions including 1) system management functions to initialize the client application, to indicate that API functions will be called, and to indicate that no further API functions will be called, 2) file management functions to create a new FlashPix storage, to open the FlashPix storage, to read FlashPix image data from the storage to write FlashPix image data to the storage, and to close the storage, and 3) image processing functions to adjust color, to adjust contrast, to perform filtering operations, to rotate, flip and shear, to define a rectangle of interest, and to define aspect ratio. One file management function to read FlashPix image data from the storage include a function to create a world, to place an image in the world, to define a region of interest within the placed image, and to extract data located within the region of interest.

28 Claims, 4 Drawing Sheets

APPLICATION PROGRAMMING INTERFACE FOR MANIPULATING FLASHPIX FILES

BACKGROUND OF THE INVENTION

This application is being filed with a microfiche appendix of computer program listings consisting of two (2) fiches having one hundred eleven (111) frames.

A portion of the disclosure of this patent document conditions material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention concerns an application programming interface usable by a software developer when writing an application for accessing and manipulating image files stored in the FlashPix file format.

DESCRIPTION OF THE RELATED ART

FlashPix refers to a file format and specification originally developed by Eastman Kodak, Hewlett-Packard, Live Picture, and Microsoft FlashPix is intended to speed up retrieval, manipulation, and output of digital color images. The FlashPix file format includes new image formatting techniques as well as desirable features of existing image file formats.

For example, FlashPix was defined to provide a universal file format, equally usable among software applications, peripherals, and on-line services. In addition, a FlashPix image file stores original image data separately from image editing data ("viewing parameters") and image annotations, such as descriptions or sound clips. Moreover, a FlashPix file includes several copies of an original image, each copy stored at a different resolution.

The above features interoperate to increase image processing speed and enhance image quality. For example, consider a case where an image processing application must display an image on a computer screen. Even though the image file might have been a file originally stored at 300 dots per inch (dpi), the application retrieves a copy of the image stored in the FlashPix file at a resolution more closely approximating screen resolution (72 dpi). Of course, retrieving a 72 dpi image is faster than retrieving a 300 dpi image, especially where the image file must be retrieved over a slow device (such as retrieval over a modem from the internet).

After the image processing application alters the 72 dpi file, the altered file is saved. According to the FlashPix specification, the original image file and the lower-resolution copies are not overwritten. Rather, viewing parameters are altered to reflect the alterations made to the 72 dpi file. Upon issuing a print command, the altered viewing parameters are used to alter the 300 dpi original image data, which is then output to a printer.

Eastman Kodak provides a Software Developer's Kit (SDK) to assist application developers in writing new applications that manipulate FlashPix-formatted image files. In particular, the SDK provides code implementing an application programming interface (API) of FlashPix-specific functions callable by a client application.

Unfortunately, the API provided by the Kodak SDK ("the FlashPix API") requires a client image processing application to make numerous complex function calls and to execute many complex algorithms in order to retrieve, manipulate and output a FlashPix image file.

For example, simply reading a FlashPix file requires several calls to FlashPix API functions. Specifically, a client application must call one function to create a "world", another function to place an image in the world, another function to define a region of interest within the placed image, and yet another function to extract data located within the region of interest.

In addition, a developer must have a sophisticated knowledge of color processing and image processing techniques in order to properly use the FlashPix API functions dedicated to color and image processing. For example, in order to increase the red content of an image, a developer must design a client application to create and pass a four-by-four color twist matrix structure to the FlashPix "FPX_SetImageColorTwistMatrix" function. Similarly, in order to rotate an image by a specified number of degrees, a developer must design a client application to create an appropriate four-by-four affine transformation matrix to be used in conjunction with the FlashPix "FPX_SetImageAffineMatrix" function.

Moreover, software developers have expressed general disappointment regarding the lack of features provided by the FlashPix API.

Due to the foregoing, it is difficult for a client application to manage FlashPix files using the FlashPix API.

Accordingly, there is a need for a single API to a client application, by which the client application may easily retrieve, manipulate, and output FlashPix-formatted files.

SUMMARY OF THE INVENTION

The present invention addresses the foregoing by providing an application programming interface using which a client application can easily manipulate FlashPix-formatted image files. Such an API shields a developer of client applications from the complexities of the FlashPix API while also providing functionality not provided by the FlashPix API. Moreover, the implementation of an API according to the present invention can be altered in response to changes to the FlashPix API. Accordingly, client applications written to an API according to the present invention need not be updated in response to changes in the FlashPix API.

According to the invention, a client application is provided with an API for manipulating FlashPix-formatted files. The API includes system management functions to initialize the client application, to indicate that API functions will be called, and to indicate that no further API functions will be called. The API also includes file management functions to create a new FlashPix storage, to open the FlashPix storage, to read FlashPix image data from the storage, to write FlashPix image data to the storage, and to close the storage. Finally, the API includes image processing functions to adjust color, to adjust contrast, to perform filtering operations, to rotate, flip and shear, to define a rectangle of interest, and to define aspect ratio. One file management function to read FlashPix image data from the storage includes a function to create a world, to place an image in the world, to define a region of interest within the placed image, and to extract data located within the region of interest.

By virtue of the foregoing, a simple and consistent application programming interface is provided, by which a client application can read data from a FlashPix file using a single function cell. As such, the present invention increases the productivity of developers of client applications using FlashPix files.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
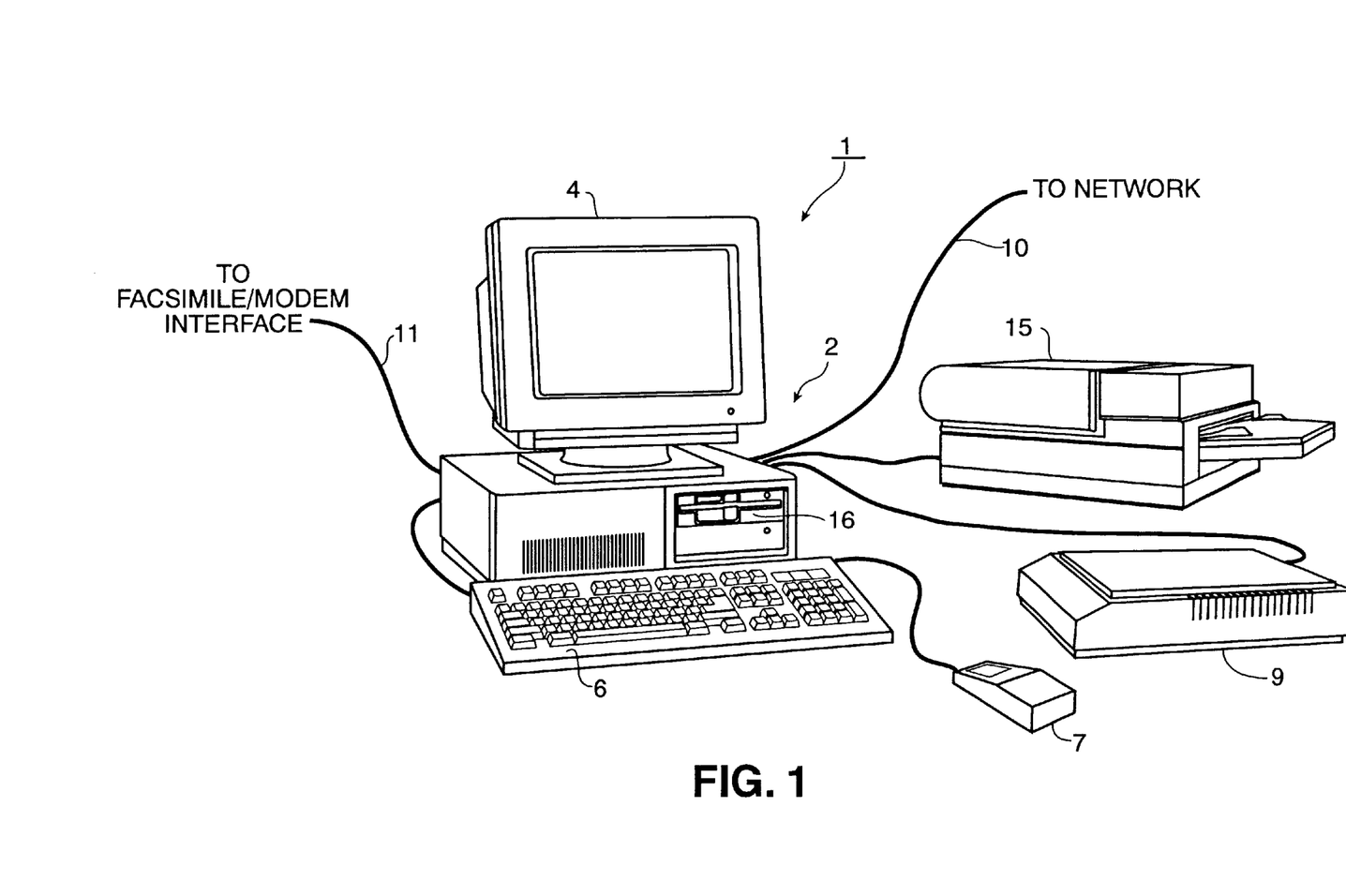
FIG. 1 is a view showing an outward appearance of a computing system utilizing the present invention.

FIG. 1 is a view showing the outward appearance of computing equipment used in a representative embodiment of the present invention. In the present invention, computing equipment 1 includes personal computer (hereinafter "PC") 2, which, in preferred embodiments of the invention, is an IBM PC-compatible computer having a windowing operating system, such as Microsoft® Windows95.

Provided with computing equipment 1 are display 4 comprising a color monitor or the like, keyboard 6 for entering text data and user commands, pointing device 7 such as a mouse for pointing and for manipulating objects displayed on display 4, and scanner 9 for acquiring image data. Network interface 10 and facsimile/modem interface 11, also included with computer equipment 1, can be used to input image and/or text data from other sources, such as external hardware devices or the World Wide Web. Printer 15 allows a user to print text, images, and the like via computing equipment 1.

Figure 2:
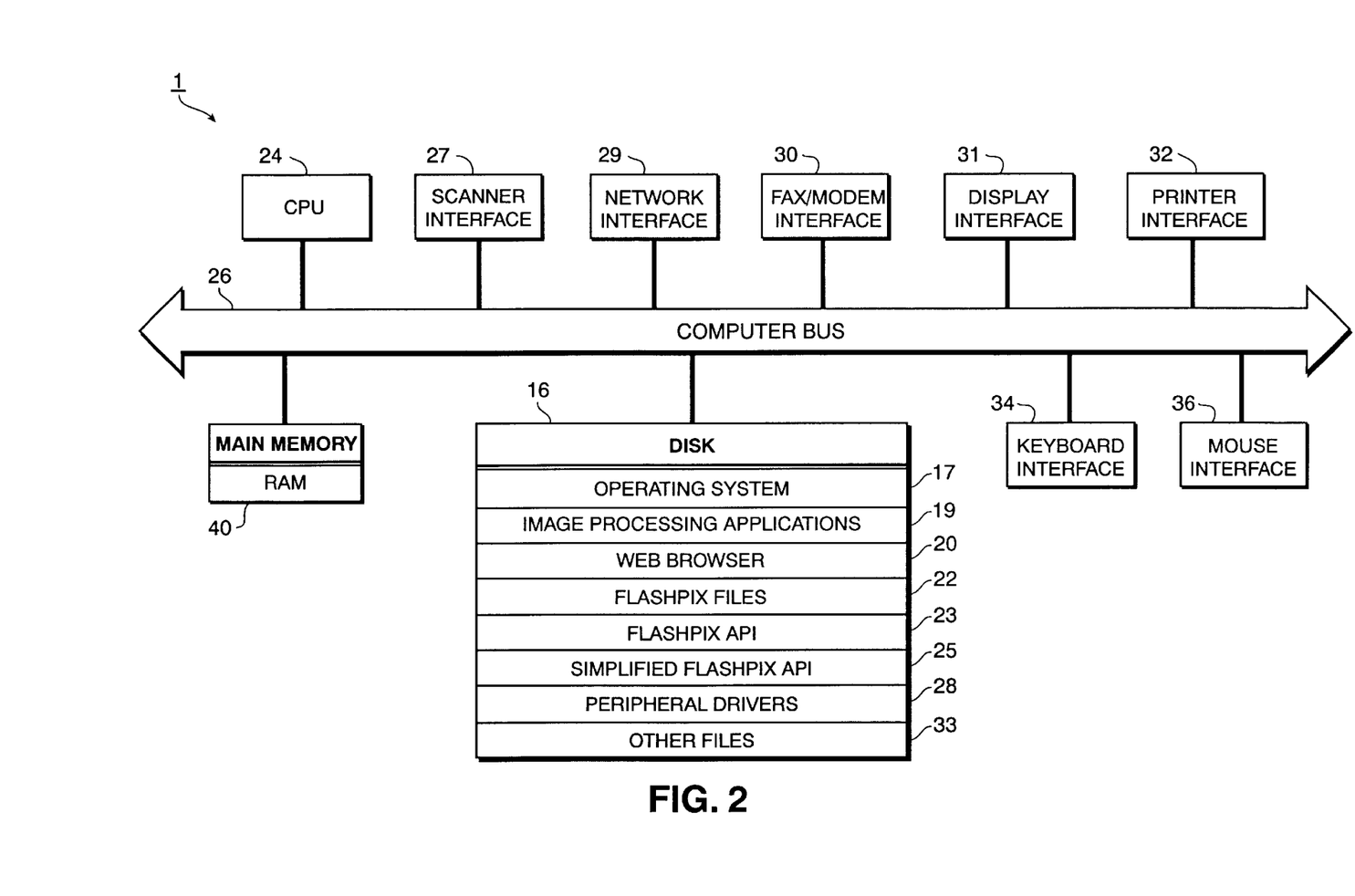
FIG. 2 is a block diagram of the internal architecture of the FIG. 1 computer system.

Computing equipment 1 includes a computer-readable memory medium, such as computer disk 16. As shown in FIG. 2, computer disk 16 stores operating system files 17, image processing applications 19, Web browser 20, peripheral drivers 28, and other files 33. Operating system 17, which in preferred embodiments of the invention is Windows95, is used to organize and execute image processing application 19. Image processing applications 19 are used to generate files, manipulate and store those files on disk 16, and to present data in those files to an operator via display 4. Web browser 20, when executed, permits a user to interact with the World Wide Web via computing equipment 1.

In addition to software, FlashPix image files 22 are stored on computer disk 16. These FlashPix files may be generated by applications 19, or obtained from other sources, such as the World Wide Web, an external hardware device (e.g., a camera, a scanner), etc. As noted above, FlashPix-format files store raw data for an image as well as additional information relating to the image. Typically, FlashPix files store (1) the image in multiple different resolutions, (2) viewing parameters which comprise transformations and the like that affect how the image is displayed, and (3) information relating to the image, such as the date that the image was formed, the hardware device that formed the image, settings on such a hardware device, etc. In addition, FlashPix files can also include an "extension list", which is used to store additional information for an image. In the present invention, audio information associated with each image is stored in an extension list in that image's FlashPix file. More information on the FlashPix file format can be found in "FlashPix Format Specification", version 1.0.1 (1996, 1997).

Disk 16 also stores computer-executable process steps to implement the FlashPix application programming interface (hereinafter "API") 23 and simplified FlashPix API 25. In a preferred embodiment of the invention, FlashPix API 23 is implemented by Kodak's FlashPix Software Developer's Kit ("SDK"). In addition, simplified FlashPix API 25 is preferably implemented by computer-executable code submitted herewith as a microfiche appendix. Details of simplified FlashPix API 25 are provided below.

FIG. 2 shows the internal construction or computer equipment 1. As shown in FIG. 2, computer equipment 1 includes a central processing unit (hereinafter "CPU") 24 interfaced with computer bus 26. Also interfaced with computer bus 26 are scanner interface 27, network interface 29, fax/modem interface 30, display interface 21, printer interface 32, keyboard interface 34, and pointing device (mouse) interface 36. Each of these provides an interface between programs executing on CPU 24 and a respective hardware device. Disk 16 (described above) and main memory 40 are also interfaced to computer bus 26.

Main memory 40 provides random access memory ("RAM") storage for use by CPU 24 when executing software, such as application programs 19 and process steps 21 noted above, More specifically, CPU 24 loads these application programs/process steps from disk 16 into main memory 40 and executes the stored programs/process steps out of main memory 40.

At this point, it should be noted that although a programmable general-purpose computer arrangement is shown in FIGS. 1 and 2, a dedicated or stand-alone computer, or other type of data processing equipment, can be used in the practice of the present invention.

Figure 3:
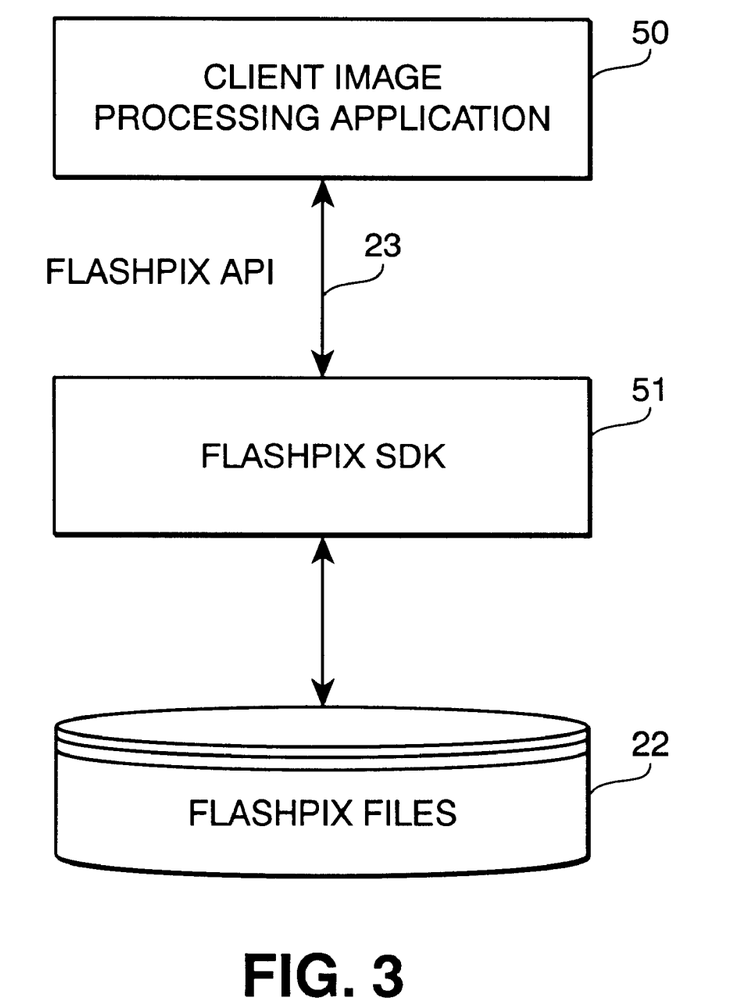
FIG. 3 block diagram illustrating a conventional use of the FlashPix API.

FIG. 3 depicts a conventional method for using FlashPix API 23 to manipulate FlashPix files. As shown in FIG. 3, client image processing application 50 communicates with FlashPix SDK 51 via function calls belonging to FlashPix API 23. Based on the particular FlashPix API calls made by client image processing application 50, FlashPix SDK 51 provides particular functionality to manipulate stored FlashPix files 22.

Client image processing application 50 may be any application which utilizes FlashPix-formatted files. One such client application is disclosed in commonly-assigned U.S. patent application No. 08/944,411, entitled "Multimedia Application Using FlashPix File Format", which is herein incorporated as if set forth in full. In the preferred embodiment described below, FlashPix API 23 and FlashPix SDK 51 each conform to the Kodak's "FlashPix Reference Implementation Programmer's Guide", Version 1.0.

As described above, the configuration shown in FIG. 3 presents problems because client image processing application 50 must be updated to conform with changes to FlashPix SDK 51 and FlashPix API 23.

Figure 4:
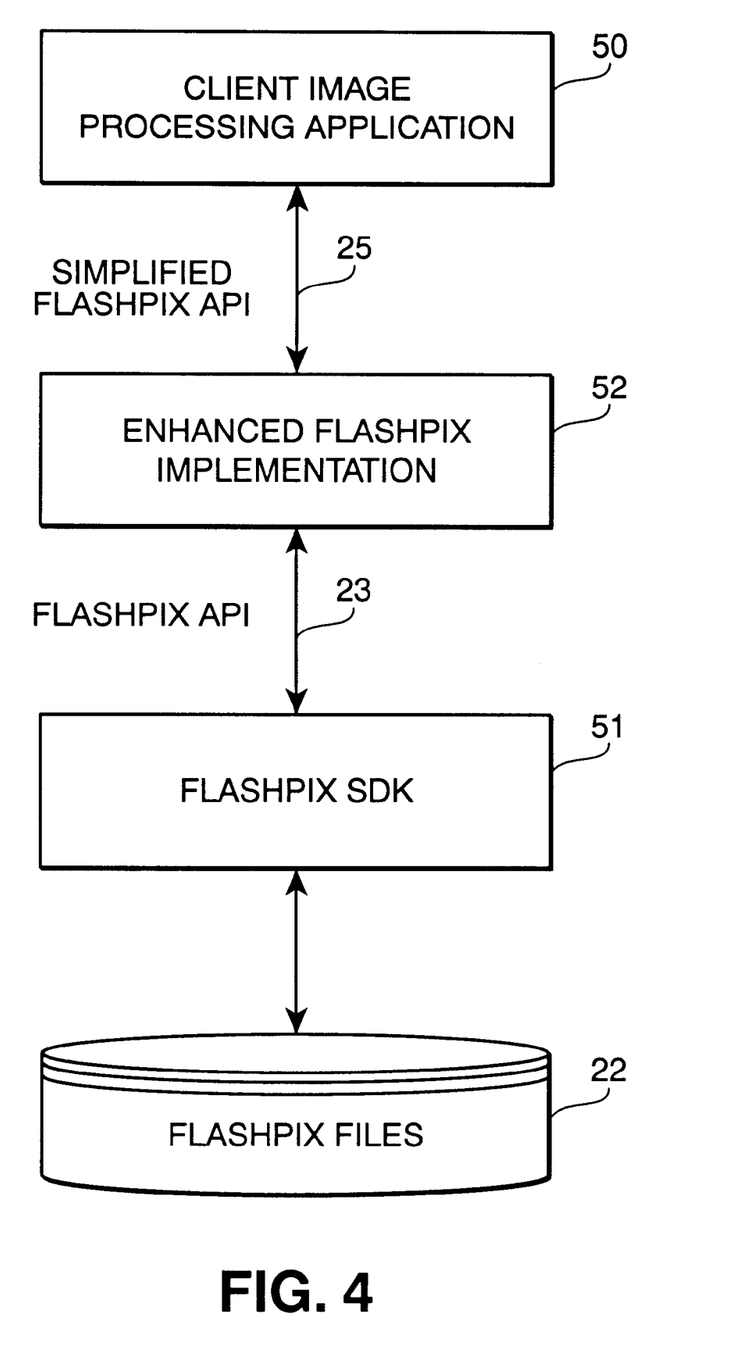
FIG. 4 is a block diagram illustrating a system using a simplified FlashPix API according to the present invention.

FIG. 4 is a block diagram for describing a system utilizing simplified FlashPix API 25, to be described below. As shown in FIG. 4, client image processing application 50 issues calls to functions belonging to simplified FlashPix API 25, which are implemented by enhanced FlashPix implementation 52.

Enhanced FlashPix implementation 52, in turn, utilizes FlashPix API 23 to access the functionality of FlashPix SDK 51 and thereby manipulates FlashPix files 22. It should be noted that enhanced FlashPix implementation 52 is not limited to issuing calls to FlashPix API 23. Rather, enhanced FlashPix implementation 52 may also make calls to other function libraries or directly to an operating system.

In order to provide a better understanding of the operation and advantages of simplified FlashPix API 25, the FlashPix file format and FlashPix API 23 are briefly described below.

FlashPix File Format

Kodak's aforementioned FlashPix Format Specification defines the FlashPix file format. In general, a FlashPix file contains four elements: a hierarchy of copies of a single image, viewing parameters, properties, and extensions.

As described above, each copy in the hierarchy of copies has a different resolution than each other copy. In this regard, the viewing parameters are used to apply various transforms to the stored copies. For example, in a case where an image processing application reads image data from a FlashPix file and performs image processing on the image data, the image data is not overwritten upon saving the changes. Rather, the viewing parameters located within the FlashPix file are changed to reflect the image processing. Therefore, upon subsequently re-reading the file, the image data therein is transformed according to the changed viewing parameters in order to recreate the saved changes.

The properties stored within FlashPix files often relate to file contents. These properties may consist of information regarding the hardware apparatus used to acquire the image data contained in a file, information regarding the software used to alter the viewing parameters of a file, image information such as a caption, or information regarding the operating system in which the file was created. Similarly, the extensions located within a FlashPix file often identify the file contents, however, extensions can be defined by developers utilizing the FlashPix file format. Most commonly, a developer will define a sound extension for associating sounds with stored FlashPix images.

The FlashPix API

FlashPix API 23 defines two sets of application programming interfaces, I/O tools and viewing tools. The I/O tools are used to client code modules in order to read, create, and write FlashPix files. Such modules may include scanner drivers, plug-in modules, and file access routines. For example, I/O tools may be used to generate FlashPix files directly from a scanner or application, to convert files between FlashPix and other file formats, to develop code for reading FlashPix files or for reading other image files and creating FlashPix files therefrom, to develop code to output FlashPix files, and to read a FlashPix file, edit the image data contained therein, and generate a new FlashPix file based on the editing. It should be noted that the I/O tools are capable of manipulating and altering aspects of a FlashPix file, such as the viewing properties, parameters or extensions.

The viewing tools allow browsing, editing and manipulation of images stored in the FlashPix format. For example, the viewing tools allow zooming, panning, and geometrical transformations, such as rotations, flip, stretch, and affine transformation. The viewing tools operate on pages, rather than images, thereby enabling an application to work with multiple images on a page. It should be noted that the viewing tools alter an appearance of an image as displayed in a FlashPix world, however, the viewing tools do not alter the contents of a subject FlashPix file.

Although specific details of FlashPix API 23 are set forth in the FlashPix Reference Implementation Programmer's Guide, the following specific examples will be useful in understanding several of the benefits of simplified FlashPix API 25.

In order to read a FlashPix file using FlashPix API 23, it is necessary to call a FlashPix API function to create a world (FPX_CreateWorld), another FlashPix API function to add an image to the world (FPX_AddImage), another FlashPix API function to create a window in the world (FPX_CreateWindow), and yet another FlashPix API function to read a 4×4 pixel square located in the window (FPX_ReadWindowSample).

FlashPix API 23 also provides functions to alter viewing parameters of a FlashPix file. By doing so, any editing to a FlashPix image can be saved and reproduced without disturbing the image data stored within a corresponding FlashPix file. For example, viewing parameters of a FlashPix file may be changed such that a stored image composed mainly of blue pixels appears mostly red when read from the FlashPix file.

In order to change the color of a stored FlashPix image as described above, FlashPix API 23 provides a FPX_SetImageInWorldColorTwistMatrix function. However, in order to utilize the FPX_SetImageInWorldColorTwistMatrix function, a developer of client image processing application 50 must provide the function with a color twist matrix which, when used with stored viewing parameters to transform the image, produces the desired result. Accordingly, a developer must be well-schooled in color processing as well as image processing to create an appropriate color twist matrix to effect a user-desired color change.

FlashPix API 23 also provides other functions for transforming viewing parameters and thereby changing an appearance of a viewed FlashPix image. For example, FlashPix API 23 provides a FPX_SetImageAffineMatrix function capable of translating, rotating, scaling, shearing (horizontally or vertically), and flipping (horizontally or vertically) an image. However, to perform any of these tasks, a developer must provide a 4×4 transformation matrix to the FPX_SetImageAffineMatrix function which produces the desired result when used (along with associated viewing parameters) to transform the image.

It is often desirable to compress the multi-resolution images stored within a FlashPix file. FlashPix API 23 attempts to address this need by allowing client application 50 to specify upon creation of a FlashPix file, for each image in the file, whether the image should be stored in a compressed format. However, in order to determine whether compression is desirable, client application 50 must analyze net file sizes resulting from various compression options, and must also determine the size of each stored image. Accordingly, effective use of the FlashPix API compression option requires significant additional processing.

It should be noted that the above descriptions of various FlashPix functions are general in nature, and, for a more complete description and for a description of the entire FlashPix API 23, the reader is directed to the aforementioned FlashPix Reference Implementation Programmers Guide Version 1.0 as well as to the FlashPix Format Specification Version 1.0.1.

SIMPLIFIED FLASHPIX API

Simplified FlashPix API 25 is intended to provide developers with a simple API to manipulate FlashPix files from within their applications. Simplified FlashPix API 25 is implemented by enhanced FlashPix implementation 52. Accordingly, any changes to FlashPix API 23 can be addressed within enhanced FlashPix implementation 52, thereby eliminating a need for updating client application 50 in response to a change to FlashPix API 23.

Simplified FlashPix API 25 is divided into three major categories of functions, system management, file management, and image processing. The details of a simplified FlashPix API according to the present invention, as well as an enhanced FlashPix implementation of a simplified FlashPix API according to the present invention, can be gleaned from the microfiche appendix of computer-executable code filed herewith. Accordingly, what follows is a general description of the functions belonging to simplified FlashPix API 25.

System Management Functions cfpInitialize cfpInitialize initializes enhanced FlashPix implementation 52 and returns a version name and version number of implementation 52. Input parameters to the function are a requested implementation version number and userInfo, which defines a memory size and units of resolution for subsequent API calls. The function checks the version number against the requested version number.

This function must be called before calling any functions belonging to simplified FlashPix API 25.

cfpTerminate cfpTerminate terminates enhanced FlashPix implementation 52.

File Management Functions cfpClose

This function closes a handle associated with an open FlashPix file so as to free internal resources. The function accepts a flag which, if set to CFP_TRUE, causes the function to save changes made to the file before closing the associated handle. If set to CFP_FALSE, the handle is closed without saving the changes.

cfpCompression

The function cfpCompression allows a developer to control file sizes of subject FlashPix files. Specifically, cfpCompression allows a user to specify compression schemes of each copy of image data within a subject FlashPix file.

In a case that a CFP_COMPRESS_ALL parameter is passed with cfpCompression, each copy of image data within the subject FlashPix file is compressed using JPEG compression. In a case that a CFP_COMPRESS_NONE parameter is passed, each copy is compressed using single color compression, as long as the copies are computer-generated graphics, otherwise, no compression is performed.

If, rather than passing CFP_COMPRESS_ALL or CFP_COMPRESS_NONE, client application 50 passes a threshold size with a call to cfpCompression, copies having a size greater than or equal to the threshold are compressed using JPEG compression, while other copies are compressed using single color compression. Again, if the other copies are not computer-generated, the other copies are not compressed.

The function also defines a parameter to override the above-described process with respect to the highest-resolution copy in the subject FlashPix file. Particularly, client application 50 may pass a flag reserveOrig which, when set to CFP_TRUE, indicates that the highest-resolution copy should not be compressed.

As a result, cfpCompression provides a developer with an simple and flexible method to control FlashPix file size while preserving original image quality. As described above, similar results can be obtained using FlashPix API 23, however, significant additional processing and function calls would be required.

cfpCreate

This functions creates a new FlashPix file and returns a handle to the file. By default, the data within the created file will not be compressed unless cfpCompression is used.

Input parameters to cfpCreate include a filename of the file to be created, the width of the highest available resolution image (in pixels), the height of the highest available resolution image (in pixels), the color space used in the image data within the file, a flag indicating whether single or multiple resolution data should be stored in the file, and a speed option indicating which of specific algorithms to use, each algorithm having a different trade-off between speed, memory, storage, and image quality.

cfpGetBoundRectangle cfpGetBoundingRectangle returns a bounding rectangle of the highest resolution image in a FlashPix file. This function may be called prior to cfpRead (described below) in order to define a buffer into which the entire image can be read.

cfpGetDisplayDimensions

This function returns the height and width necessary to display a FlashPix image, as well as the units in which the height and width are represented.

cfpGetInfo cfpGetInfo obtains image summary, film source, intellectual, content descriptive, camera, film, original document, scanning device, or other image-related information from a FlashPix file. A handle to the file and a parameter indicative of the information to be accessed are passed with a call to the function.

cfpHierarchy

In a case that a FlashPix file is in single-resolution format, cfpHierarchy can be called to generate multiple-resolution data from the single-resolution image. In a case that the FlashPix file is already in a multiple-resolution format, cfpHierarchy regenerates the multiple resolution in accordance with a passed speedOption parameter. The speedOption parameter is similar to that discussed above with respect to cfpCreate.

cfpOpen cfpOpen opens a specified FlashPix file and returns a handle to the file upon success. Relevant image information, such as image dimensions and color space, are located in a structure associated with the handle.

cfpRead

As described above, client application 50 utilizing Flash-Pix API 23 must call several individual FlashPix API functions in order to read a FlashPix image. In contrast, simplified FlashPix API 25 offers developers the function cfpRead. This function returns a specified portion of a specified-resolution FlashPix image into a specified buffer with the associated viewing parameters applied.

If a size of the specified buffer is less than a size of the FlashPix image, the image data will be resampled. In addition, an aspect ratio of the image will be maintained regardless of the specified buffer.

Accordingly, simplified API 25 provides a developer with a simple method for enabling an application to read FlashPix files.

cfpSaveAs

FlashPix API 23 does not offer a function which allows client application 50 to save an opened FlashPix file under a new name. Rather, using only FlashPix API 23, client application 50 would have to access several functions in order to accomplish this task. Specifically, FlashPix API 23 requires the use of individual functions to open an existing FlashPix file, to create a new FlashPix file, to transfer the contents of the opened file to the newly-created file, and to save the new file.

In order to address this shortcoming, simplified FlashPix API 25 provides a cfpSaveAs function, which allows client application 50 to save an opened FlashPix file under a new name simply by calling this function.cfpSetDisplayDimensions cfpSaveViewingParameters and cfpRestoreViewingParameters FlashPix API 23 offers several functions which allow a developer to enable client application 50 to perform image processing upon a FlashPix file. Accordingly, several of these functions alter the viewing parameters stored within the FlashPix file. Unfortunately, it is difficult to return the viewing parameters to their previous values if the results of a particular image processing function are unsatisfactory. Oftentimes, the only method by which original viewing parameters can be restored is to apply inverses of the previously-applied functions. This method requires a sophisticated knowledge of image processing, and is often fruitless in cases where multiple image processing functions have been applied to a FlashPix file.

As a result of the foregoing, simplified FlashPix API 25 is provided with two functions, cfpSaveViewingParameters and cfpRestoreViewingParameters. In operation, client application 50 calls cfpSaveViewingParameters prior to performing complex image processing upon a FlashPix image. As a result, client application can restore subsequently-processed viewing parameters to their pre-processed state by calling the cfpRestoreViewingParameters function. Accordingly, image processing mistakes or trial runs are easily corrected using functions provided by the simplified FlashPix API.

cfpSetInfo cfpSetInfo sets image summary, film source, intellectual, content descriptive, camera, film, original document, scanning device, or other image-related information from a FlashPix file. A handle to the file and a parameter indicative of the information to be set, as well as values of the information, are passed with a call to the function.

cfpWrite cfpWrite writes a specified buffer of data to a specified portion of a highest resolution image in a specified FlashPix file.

Image Processing Functions cfpBeginImgProc, cfpCancelImgProc, and cfpCommitImgProc These functions allow a user to "undo" image processing in a similar manner as described above with respect to cfpSaveViewingParameters and cfpRestoreViewingParameters. More specifically, cfpBeginImgProc is called prior to calling cfpColorAdjust, cfpFilter, or cfpSpatialOperation. After desired image processing is completed, a user may decide that the processing result is unsatisfactory. In this case, client application 50 need only call cfpCancelImgProc, whereby all changes made after calling cfpBeginImgProc are discarded. On the other hand, these changes may be saved by calling cfpCommitImgProc.

It should be noted that FlashPix API 23 does not offer a function equivalent to either cfpBeginImgProc, cfpCancelImgProc, or cfpCommitImgProc.

cfpColorAdjust cfpColorAdjust is a function providing means to control a percentile adjustment of each of the color components in a FlashPix file, including hue, saturation, red, green, blue, and contrast. Advantageously, cfpColorAdjust requires only three simple input parameters: a handle to a FlashPix image, a type of color component to adjust, and an amount by which the component should be adjusted.

As described above, FlashPix API 23 requires creation of a color twist matrix which corresponds to desired color adjustment. Accordingly, simplified FlashPix API 25, through the cfpColorAdjust function, provides an easier method to control color than FlashPix API 23.

cfpFilter

The function cfpFilter is used to perform filtering operations, such as sharpening or blurring, upon a FlashPix image. Similarly to cfpColorAdjust, cfpFilter requires only three input parameters: a handle to a FlashPix image, a type of filter to be applied, and a degree to which the filter should be applied.

As described above, FlashPix API 23 requires creation of an appropriate affine transformation matrix in order to perform a desired filtering operation. Accordingly, simplified FlashPix API 25, through the cfpFilter function, provides an easier method to control filtering than that of FlashPix API 23.

cfpGetAspectRatio cfpGetAspectRatio returns a parameter indicating an aspect ratio of a FlashPix image. The aspect ratio is calculated by dividing the parameter by the height of the image.

cfpGetAffineMatrix

A affine matrix within a FlashPix film is a set of parameters used to rotate, shear, scale, skew, and translate images in a FlashPix file. cfpGetAffineMatrix provides a means to examine each element of the affine matrix of a specified FlashPix file.

cfpGetRectangleOfInterest cfpGetRectangleOfInterest allows client application 50 to obtain a rectangle of interest of a specified FlashPix image. The function returns the values of the top left and bottom right corners of the rectangle.

cfpSetAffineMatrix cfpSetAffineMatrix provides a means to specify each element of the aforementioned affine matrix of a specified FlashPix file.

cfpSetAspectRatio

This function modifies the aspect ratio of a specified FlashPix file in accordance with an input parameter indicating a desired horizontal dimension. Only the horizontal dimension is needed because the image height is fixed.

cfpSetRectangleOfInterest cfpSetRectangleOfInterest allows client application 50 to specify a region of a specified image to be retained. The region is specified by means of an input parameter indicating top left and bottom right coordinates of the rectangular region.

cfpSpatialOperation

The function cfpSpatialOperation is used to rotate, shear, skew, scale, and translate a FlashPix image. cfpSpatialOperation simply requires a client application to pass a handle to a FlashPix image, a desired type of operation, information regarding the degree to which the desired operation is to be applied, and a flag indicating whether the image needs to be resized to fit into its original dimensions following a rotate, shear, or skew operation.

To the contrary, and as described above, FlashFix API 23 offers no function similar to cfpSpatialOrientation. Rather, FlashPix API 23 requires a developer to create an affine transformation matrix corresponding to desired spatial processing.

The invention has been described with respect to particular illustrative embodiments. It is to be understood that the invention is not limited to the above-described embodiments and that various changes and modifications may be made by those of ordinary skill in the art without departing from the spirit and scope of the appended claims.

What is claimed is:

1. Computer-executable process steps, the steps providing an application programming interface (API) to a client application for manipulating multi-resolution image files, each of which is capable of storing images in multiple different resolutions and parameters for viewing an image contained therein, said API having functions comprising:

system management functions to initialize the client application, to indicate that API functions will be called, and to indicate that no further API functions will be called;

file management functions to create a new multi-resolution image storage, to open the multi-resolution image storage, to read image data from the multi-resolution image storage, to write image data to the storage, and to close the storage; and image processing functions to adjust color, to adjust contrast, to perform filtering operations, to rotate, to flip, to shear, to define a rectangle of interest, and to define aspect ratio, wherein one file management function to read image data from the storage comprises a single function to create a world, to place an image in the world, to define a region of interest within the placed image, and to extract data located within the region of interest.

2. Computer-executable process steps according to claim 1, wherein said API comprises a function to save a multi-resolution image file under a name different than a current name of the multi-resolution image file.

3. Computer-executable process steps according to claim 1, wherein said API comprises a function to save all viewing parameters of a multi-resolution image file.

4. Computer-executable process steps according to claim 3, wherein said API comprises a function to restore the saved viewing parameters.

5. Computer-executable process steps according to claim 1, wherein said API comprises a function to adjust color components in a multi-resolution image file, wherein the function to adjust color components executes to create a color twist matrix in accordance with a desired color component adjustment.

6. Computer-executable process steps according to claim 1, wherein said API comprises a function to perform filtering operations upon an image, wherein the function to perform filtering operations executes to create an affine transformation matrix in accordance with a desired filtering operation.

7. Computer-executable process steps according to claim 1, wherein said API comprises a function to perform spatial operations upon an image, wherein the function to perform spatial operations executes to create an affine transformation matrix in accordance with a desired spatial operation.

8. Computer-executable process steps according to claim 1, wherein said API comprises a function to indicate an initial state of an image.

9. Computer-executable process steps according to claim 8, wherein said API comprises a function to return the image to the initial state.

10. Computer-executable process steps according to claim 8, wherein said API comprises a function to save changes made to the initial state of the image.

11. Computer-executable process steps according to claim 1, wherein said API comprises a compression function using a first flag indicating an image data size, and wherein image data of a single equal to or greater than the indicated image data size is stored in a subject multi-resolution image file in a compressed format.

12. Computer-executable process steps according to claim 11, wherein the compression function uses a second flag indicating whether a highest-resolution image is to be stored in the subject multi-resolution image file in a compressed format, the second flag overriding the first flag.

13. Computer-executable process steps according to claim 11, wherein image data of a size less than the indicated image data size is not compressed.

14. Computer-executable process steps according to claim 11, wherein image data of a size less than the indicated image data size is compressed if the image data are computer-generated graphics.

15. A computer-readable memory medium storing computer-executable process steps, the steps providing an application programming interface (API) to a client application for manipulating multi-resolution image files, each of which is capable of storing images in multiple different resolutions and parameters for viewing an image contained therein, said API having functions comprising:

system management functions to initialize the client application, to indicate that API functions will be called, and to indicate that no further API functions will be called;

file management functions to create a new multi-resolution image storage, to open the multi-resolution image storage, to read image data from the multi-resolution image storage, to write image data to the storage, and to close the storage; and image processing functions to adjust color, to adjust contrast, to perform filtering operations, to rotate, to flip, to shear, to define a rectangle of interest, and to define aspect ratio, wherein the functions to read image data from the storage comprise a single function to create a world, to place an image in the world, to define a region of interest within the placed image, and to extract data located within the region of interest.

16. A computer-readable memory medium according to claim 15, wherein said API comprises a function to save a multi-resolution image file under a name different than a current name of the multi-resolution image file.

17. A computer-readable memory medium according to claim 15, wherein said API comprises a function to save all viewing parameters of a multi-resolution file.

18. A computer-readable memory medium according to claim 17, wherein said API comprises a function to restore the save viewing parameters.

19. A computer-readable memory medium according to claim 15, wherein said API comprises a function to adjust color components in a multi-resolution image file, wherein the function to adjust color components executes to create a color twist matrix in accordance with a desired color component adjustment.

20. A computer-readable memory medium according to claim 15, wherein said API comprises a function to perform filtering operations upon an image, wherein the function to perform filtering operations executes to create an affine transformation matrix in accordance with a desired filtering operation.

21. A computer-readable memory medium according to claim 15, wherein said API comprises a function to perform spatial operations upon an image, wherein the function to perform spatial operations executes to create an affine transformation matrix in accordance with a desired spatial operation.

22. A computer-readable memory medium according to claim 15, wherein said API comprises a function to indicate an initial state of an image.

23. A computer-readable memory medium according to claim 22, wherein said API comprises a function to return the image to the initial state.

24. A computer-readable memory medium according to claim 22, wherein said API comprises a function to save changes made to the initial state of the image.

25. A computer-readable memory medium according to claim 15, wherein said API comprises a compression function using a first flag indicating an image data size, and wherein image data of a size equal to or greater than the indicated image data size is stored in a subject multi-resolution image file in a compressed format.

26. A computer-readable memory medium according to claim 25, wherein the compression function uses a second flag indicating whether a highest-resolution image is to be stored in the subject multi-resolution image file in a compressed format, the second flag overriding the first flag.

27. A computer-readable memory medium according to claim 25, wherein image data of a size less than the indicated image data size is not compressed.

28. A computer-readable memory medium according to claim 25, wherein image data of a size less than the indicated image data size is compressed if the image data are computer-generated graphics.

* * * * *

UNITED STATES PATENT AND TRADEMARK OFFICE
CERTIFICATE OF CORRECTION

PATENT NO.    : 6,272,558 B1
DATED         : August 7, 2001
INVENTOR(S)   : Jonathan Hui et al.

It is certified that error appears in the above-identified patent and that said Letters Patent is hereby corrected as shown below:

Title page,
Item [57], ABSTRACT,
Line 9, "storage" should read -- storage, --.
Line 15, "include" should read -- includes --.

Column 1,
Line 27, "Microsoft" should read -- Microsoft. --.

Column 2,
Line 29, "single" should read -- simple --.

Column 3,
Line 1, "cell." should read -- call. --.
Line 16, "FIG. 3" should read -- FIG. 3 is a --.

Column 4,
Line 23, "interface 21," should read -- interface 31, --.

Column 5,
Line 42, "interfaces," should read -- interfaces: --.

Column 7,
Line 4, "functions," should read -- functions: --.
Line 62, "an" should read -- a --.

Column 8,
Line 2, "functions" should read -- function --.
Line 14, "cfpGetBoundRectangle" should read -- cfpGetBoundingRectangle --.

Column 9,
Line 6, "this function.cfpSetDisplayDimen-" should read -- this function. --.
Line 7, "sions" should be deleted.
Line 24, "functions," should read -- functions: --.

UNITED STATES PATENT AND TRADEMARK OFFICE
CERTIFICATE OF CORRECTION

PATENT NO. : 6,272,558 B1
DATED : August 7, 2001
INVENTOR(S) : Jonathan Hui et al.

It is certified that error appears in the above-identified patent and that said Letters Patent is hereby corrected as shown below:

Column 10,
Line 26, "A" should read -- An --.

Column 11,
Line 67, "single" should read -- size --.

Column 12,
Line 49, "save" should read -- saved --.

Signed and Sealed this

Sixth Day of August, 2002

Attest:

JAMES E. ROGAN
Attesting Officer     Director of the United States Patent and Trademark Office